US011476784B1

(12) United States Patent
Kurihara et al.

(10) Patent No.: US 11,476,784 B1
(45) Date of Patent: Oct. 18, 2022

(54) LOW ACOUSTIC NOISE OPEN LOOP MOTOR STARTUP

(71) Applicant: Allegro MicroSystems, LLC, Manchester, NH (US)

(72) Inventors: Masahira Kurihara, Prague (CZ); Dmytro Sakharov, Kyiv (UA); Anton Babushkin, Kyiv (UA)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 17/371,409

(22) Filed: Jul. 9, 2021

(51) Int. Cl.
    *H02P 6/21* (2016.01)
    *H02P 6/182* (2016.01)

(52) U.S. Cl.
    CPC ............... *H02P 6/21* (2016.02); *H02P 6/182* (2013.01)

(58) Field of Classification Search
    CPC .................................. H02P 6/21; H02P 6/182
    See application file for complete search history.

(56) References Cited

U.S. PATENT DOCUMENTS

| 9,203,339 | B2 | 12/2015 | Sato | |
|---|---|---|---|---|
| 9,929,683 | B2 | 3/2018 | Sonoda et al. | |
| 2010/0164428 | A1* | 7/2010 | Xu | H02P 21/24 310/211 |
| 2018/0159455 | A1* | 6/2018 | Pietromonaco | H02P 25/089 |
| 2019/0013750 | A1* | 1/2019 | Leman | H02P 6/085 |
| 2020/0395876 | A1* | 12/2020 | Greiner | H02P 1/04 |

* cited by examiner

*Primary Examiner* — Zoheb S Imtiaz
(74) *Attorney, Agent, or Firm* — Daly Crowley Mofford & Durkee, LLP

(57) ABSTRACT

Methods and apparatus for open loop startup of a three-phase motor that reduces acoustic noise. During rotor alignment of the motor, there is a maximum level for a phase current to the motor. After the rotor alignment, open loop motor startup is performed during which the phase current has a first slope. At a selected time, such as when a frequency of the phase current reaches a first threshold, the phase current transitions to a second slope.

16 Claims, 4 Drawing Sheets

LOW ACOUSTIC NOISE OPEN LOOP MOTOR STARTUP

BACKGROUND

A variety of circuits to control and drive brushless DC (BLDC) electric motors are known. Conventional BLDC motor control techniques may employ BEMF (back emf) information for position estimation, however, BEMF information is not available at zero speed, for example, at motor startup. Another conventional startup technique is to drive the motor in open loop without position estimation (e.g., align and go for example), which may cause reverse rotation during startup. In addition, this technique may increase startup time if a relatively conservative startup profile is chosen, or, render motor startup unreliable if an aggressive startup profile is chosen.

It is known that some three-phase BLDC motor startup techniques can use a Hall sensor. Other techniques use sensor-less control. The various startup techniques may have advantages and disadvantages. For example, a conventional Hall effect sensor-based startup configuration typically has three Hall elements, one for each phase. Hall effect sensor configurations may provide relatively reliable startup, fast startup, and adaptation to different motors and load conditions without changing the parameters for the controller. However, typical Hall effect sensor startup techniques produce a rectangular current in which the changing phase of the current is relatively unsmooth so as to generate acoustic noise.

Conventional sensorless control of motor startup is open-loop to gain an enough torque to spin up the motor from static friction since the start-up torque needs to be higher than normal operation current in sensorless operation. In such systems, the startup current needs to be high enough to secure the startup. However, the high-current at start-up in conventional controllers creates acoustic noise from the motor.

In the automotive industry, motor control is shifting toward sensorless control due to reliability and cost. Also there is a need for quieter motor operation for electric vehicles (EV) and hybrid EV (HEV). Motor acoustic noise generated in combustion engines is less problematic than in electric vehicles. However, silent motor operation is required especially when a combustion engine is stopped.

SUMMARY

Embodiments of the disclosure provide methods and apparatus for a BLDC motor controller for regulating a phase current to the motor during open loop startup for reducing acoustic noise during startup in comparison with conventional systems. Low acoustic noise during motor startup is useful in vehicles, such as electric vehicles.

In example embodiments, a motor controller uses position open-loop control with current limited operation. A first slope of startup current determines a down trend ratio of the phase current limit. A second slop determines an up-trend of the phase current limit. At a transition in the driving frequency of the motor drive signal, for example, the slope of the startup current transitions from the first current slope to the second current slope. The various parameters described herein, e.g., current slope and driving frequency, can be selected to meet the needs of a particular application. When the open-loop endpoint of the phase current level matches the required driving current using sensorless control, the phase advance error is minimized which also minimizes acoustic noise from the motor.

In one aspect, a method comprises: starting up a three-phase BLDC motor in open loop by: during rotor alignment of the motor, allowing a maximum start up amplitude for a phase current to the motor; after the rotor alignment, performing open loop motor startup during which an amplitude of the phase current has a first slope; and transitioning the amplitude of the phase current to a second slope.

A method can further include one or more of the following features: transitioning the phase current to the second slope when a frequency of the phase current reaches a first threshold that defines a transition frequency, the first slope is negative, the second slope is positive, a rate of change for the second slope is greater than a rate of change of the first slope, the slope of the phase current equals one when an amplitude of the phase current reaches a second threshold, receiving a value for the transition frequency from a user, the rotor alignment moves the rotor to a known position, the phase current is at the maximum start up amplitude at the beginning of the open loop startup, and/or the transition frequency corresponds to a given speed of the motor.

In another aspect, a motor controller comprises: circuitry configured to: start up a three-phase BLDC motor in open loop by: during rotor alignment of the motor, allow a maximum start up amplitude for a phase current to the motor; after the rotor alignment, perform open loop motor startup during which an amplitude of the phase current has a first slope; and transition the amplitude of the phase current to a second slope.

A motor controller can further include one or more of the following features: the circuitry is further configured to transition the phase current to the second slope when a frequency of the phase current reaches a first threshold that defines a transition frequency, the first slope is negative, the second slope is positive, a rate of change for the second slope is greater than a rate of change of the first slope, the slope of the phase current equals one when an amplitude of the phase current reaches a second threshold, the circuitry is further configured to receive a value for the transition frequency from a user, the rotor alignment moves the rotor to a known position, the phase current is at the maximum start up amplitude at the beginning of the open loop startup, the transition frequency corresponds to a given speed of the motor, and/or the motor controller comprises a BLDC motor controller IC package.

In a further aspect, a motor controller IC package comprises: output pins to provide signals to drive a three-phase BLDC motor; and means for starting up the three-phase BLDC motor by performing open loop motor startup during which an amplitude of the phase current has a first slope, and transitioning the amplitude of the phase current to a second slope when a frequency of the phase current reaches a first threshold that defines a transition frequency.

BRIEF DESCRIPTION OF THE DRAWINGS

The foregoing features of this invention, as well as the invention itself, may be more fully understood from the following description of the drawings in which.

DETAILED DESCRIPTION

Figure 1:
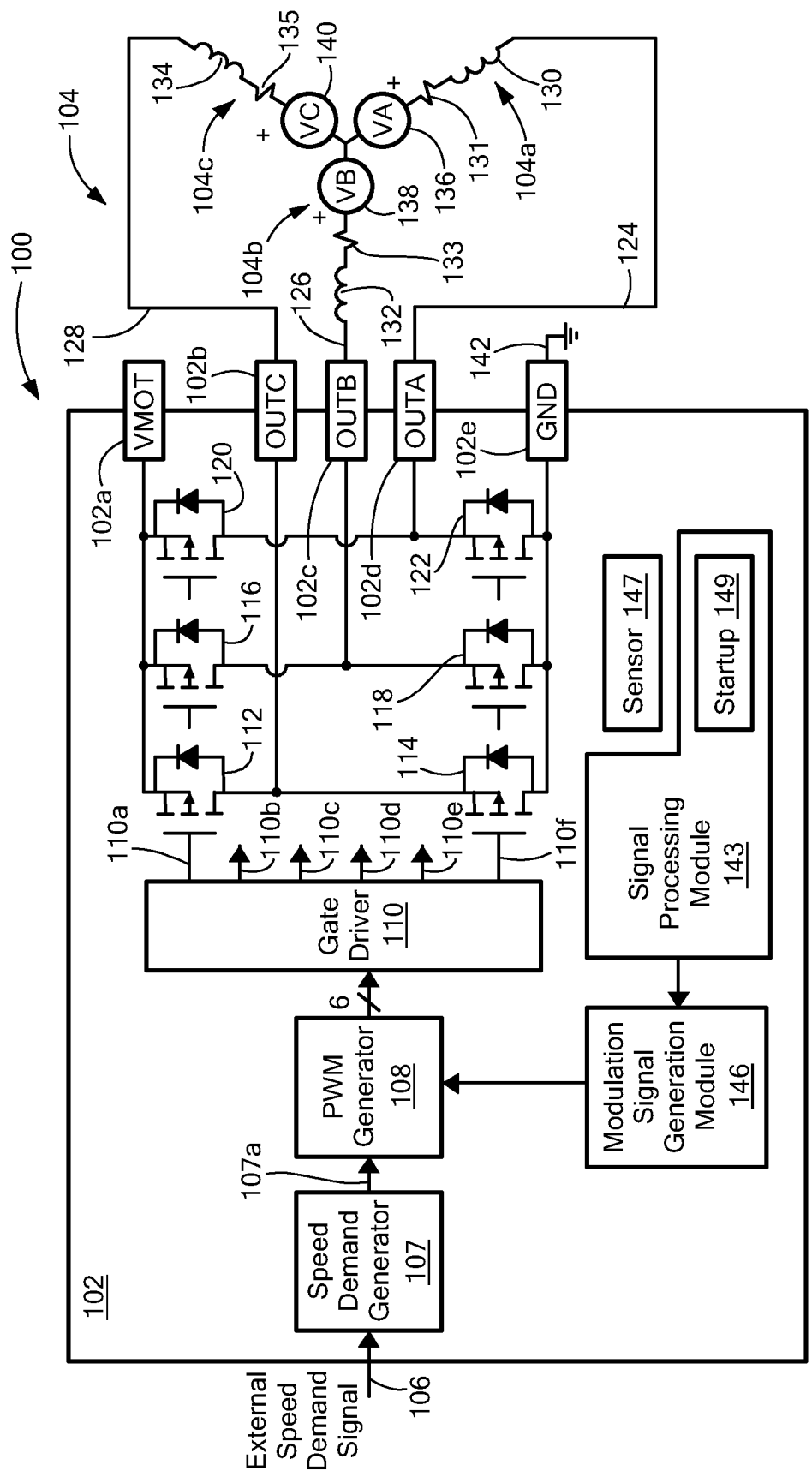
FIG. 1 is a schematic representation of a motor controller controlling phase current to a motor in open loop startup to reduce acoustic noise in accordance with example embodiments of the disclosure.

FIG. 1 shows an example motor control circuit 102 coupled to an electric motor 104 for providing BLDC motor startup with low acoustic noise open loop startup in accordance with example embodiments of the disclosure. Phase current is controlled during open loop motor startup to reduce acoustic noise, as described more fully below.

The motor 104 is shown to include three windings 104a, 104b, 104c, which can be depicted as a respective equivalent circuit having an inductor in series with a resistor and in series with a back EMF (BEMF) voltage source. For example, the winding A 104a is shown to include an inductor 130 in series with a resistor 131 and in series with a back EMF voltage source VA 136.

The motor control circuit 102 includes a speed demand generator 107 coupled to receive an external speed demand signal 106 from outside of the motor control circuit 102. The external speed demand signal 106 can be in one of a variety of formats. In general, the external speed demand signal 106 is indicative of a speed of the motor 104 that is requested from outside of the motor control circuit 102.

The speed demand generator 107 is configured to generate a speed demand signal 107a. A pulse width modulation (PWM) generator 108 is coupled to receive the speed demand signal 107a and configured to generate PWM signals having a duty cycle that is controlled by the speed demand signal 107a. The PWM generator 108 is also coupled to receive modulation waveforms from a modulation signal generation module 146. The PWM signals are generated with a modulation characteristic (i.e., a relative time-varying duty cycle) in accordance with the modulation waveforms.

The motor control circuit 102 also includes a gate driver circuit 110 coupled to receive the PWM signals and configured to generate PWM gate drive signals 110a, 110b, 110c, 110d, 110e, 110f to drive six transistors 112, 114, 116, 118, 120, 122 arranged as three half-bridge circuits 112/114, 116/118, 120/122. The six transistors 112, 114, 116, 118, 120, 122 operate in saturation to provide three motor drive signals VoutA, VoutB, VoutC, 124, 126, 128, respectively, at nodes 102d, 102c, 102b, respectively. It is understood that any suitable configuration of switching elements can be used to provide the motor drive signals.

The motor control circuit 102 can also include a signal processing module 143 for processing signals from a sensor module 147. In embodiments, the signal processing module 143 can include a startup module 149 to control motor startup. The sensor module 147 can be configured to receive back EMF signal(s) (e.g., can be coupled to receive one or more of the motor drive signals 124, 126, 128, which include back EMF signals directly observable at times when the motor windings 104a, 104b, 104c are not being driven and respective winding currents are zero).

The signal processing module 143 is configured to generate a position reference signal indicative of a rotational reference position of the motor 104. The modulation signal generation module 146 is coupled to receive the position reference signal and configured to change a phase of the modulation waveforms provided to the PWM generator 108.

The motor control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

It is understood that embodiments of the disclosure are applicable to a wide range of applications in which low acoustic noise during motor startup is desirable. Example vehicle applications include battery cooling fan, radiator fans, fuel control, oil pumps, etc.

Figure 2:
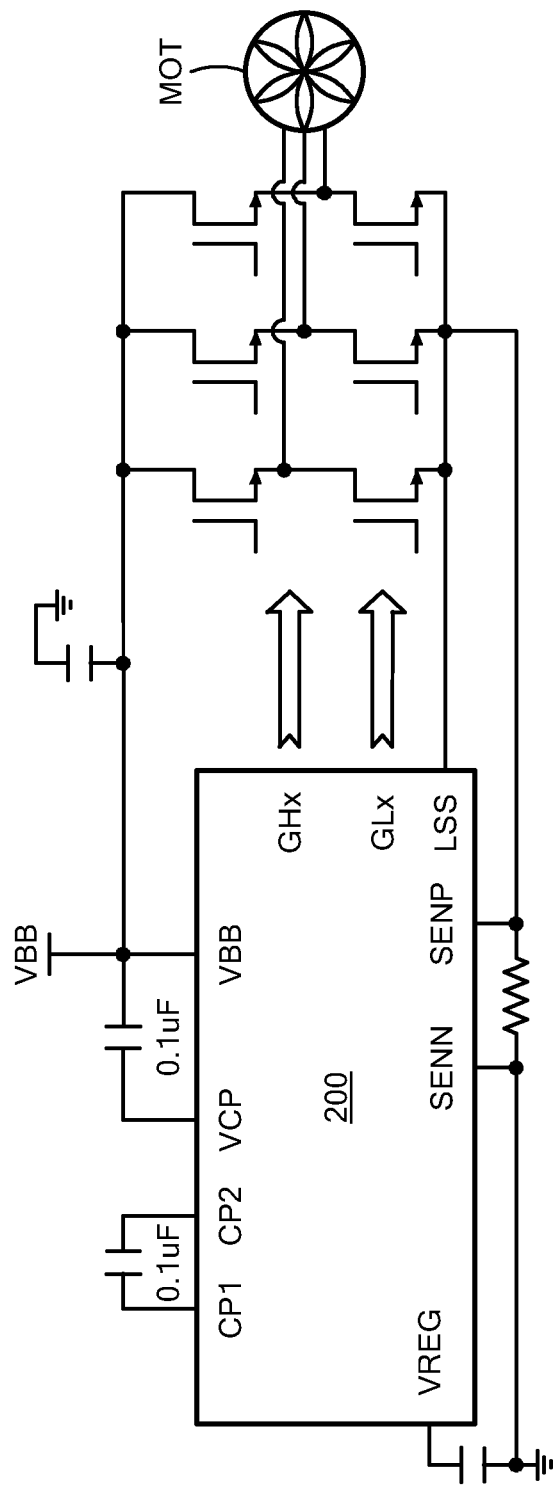
FIG. 2 is an example IC package embodiment of the controller of FIG. 1.

FIG. 2 shows an example BLDC motor controller IC package 200 in accordance with example embodiments of the disclosure. A power supply input terminal VBB can be coupled to a voltage supply to which a charge pump input VCP can also be coupled. A capacitor can be coupled across charge pump inputs CP1, CP2. The motor controller 200 generates gate driver signals for a three-phase motor MOT. In the illustrated embodiment, the motor controller 200 generates high side GHx and low side GLx gate driver signals for controlling bridge transistors that drive the three phases of the motor MOT.

Embodiments of the controller 200 provide a three-phase, sensorless, brushless DC (BLDC) motor driver (gate driver) for low acoustic noise during open loop startup. In embodiments, the controller 200 may include a field-oriented control (FOC) module for efficiency and acoustic noise performance. Motor speed may be controlled through pulse width modulation (PWM).

In embodiments, the controller 200 accepts a start command and checks the BEMF signals. If the motor is spinning backward, the controller may apply braking until the brake current disappears. If the motor is spinning forward, the controller 200 synchronizes the driving frequency and goes into the full sensorless control. When the motor is at a standstill, the controller 200 can apply rotor alignment and initiate motor control. The controller 200 performs motor rotor alignment to ensure the rotor is parked at known position.

Upon completion of rotor alignment, an open-loop startup process is executed in which the amplitude of phase current is regulated to provide a stable torque. The driving frequency ramps up until a stable bemf condition is achieved. Once the open-loop start-up is completed, the controller 200 may operate in a sensorless FOC control mode.

Open loop start-up controls the phase current ramp-up to minimize the acoustic noise from the open-loop start-up to the sensorless control. To maintain appropriate phase advance, the current amplitude is a factor at any given driving speed and load. The appropriate current level depends on motor characteristics and the connected load. To have a reliable start-up, the start-up current should spin the motor. To achieve a quieter transition, the current toward the end of open-loop startup period can be reduced if the load conditions permit. When the current level is closer to required current level in the feedback control, then the transition noise may be minimized.

Figure 3:
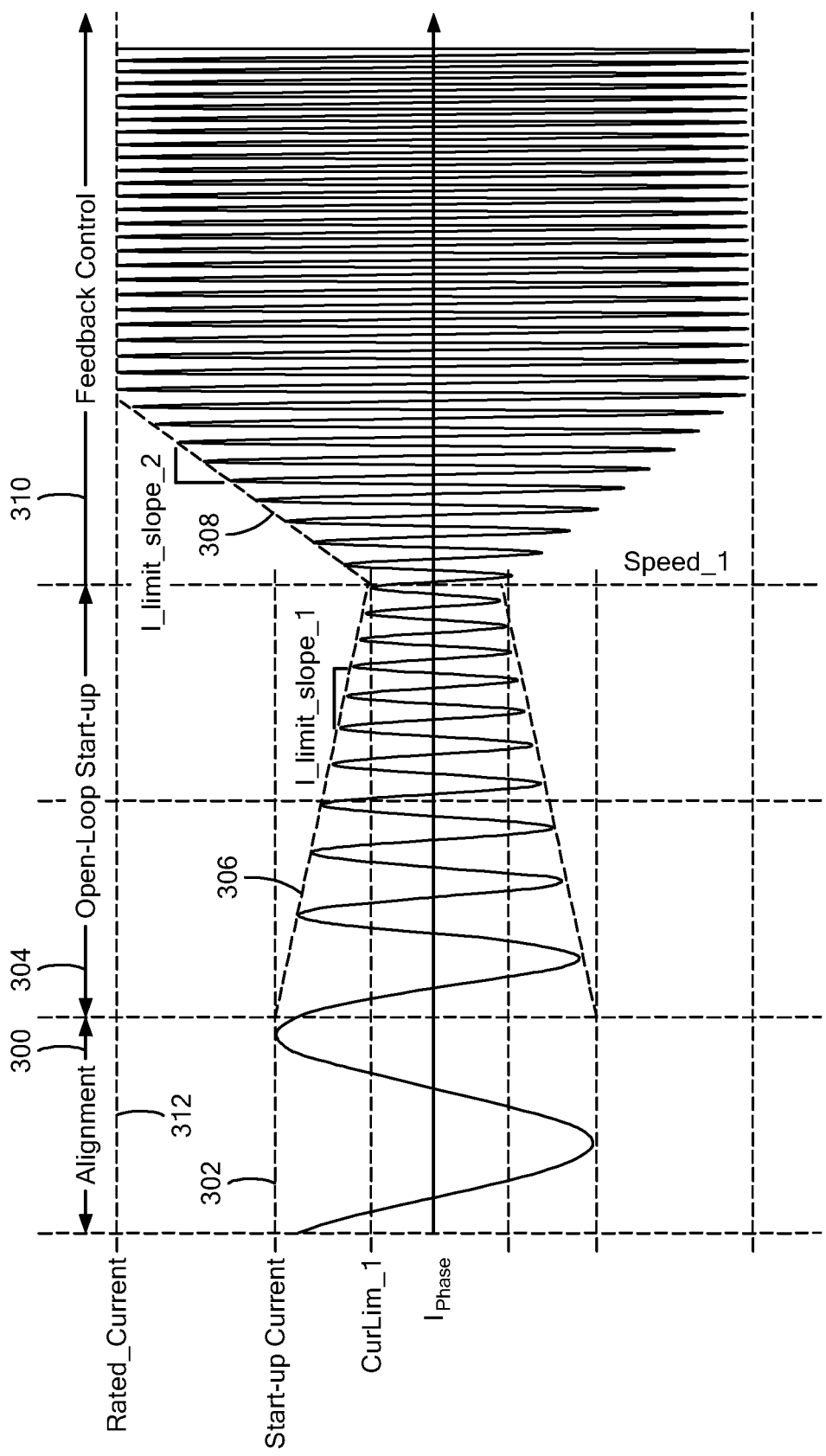
FIG. 3 is an example waveform diagram for the phase current to a three-phase motor for reducing acoustic noise during startup in accordance with example embodiments of the disclosure.

FIG. 3 shows an example waveform diagram for the phase current $I_{PHASE}$ to one of the phases of a three-phase motor for reducing acoustic noise during open loop startup in accordance with example embodiments of the disclosure. During rotor alignment 300, phase current $I_{PHASE}$, has a maximum amplitude 302 shown as start-up current. When commanded to spin the motor, the controller executes motor rotor alignment to ensure the rotor is parked at known position. An open loop startup 304 process begins after alignment is completed. During open loop startup 304, the phase current $I_{PHASE}$ has a first slope 306 shown as I_limit_slope_1 that determines a down trend ratio of the phase current. When the frequency of the phase current $I_{PHASE}$ is greater than a selected threshold, the phase current $I_{PHASE}$ transitions to a second slope 308 shown as I_limit_slope_2 as a feedback control phase 310 is entered. The amplitude of the phase current $I_{PHASE}$ increases until reaching a rated current level 312. In embodiments, a frequency of the drive signal increases until a selected frequency is reached.

As can be seen, an example embodiment, the phase current $I_{PHASE}$ begins open loop startup 304 at the startup current amplitude 302 and decreases in amplitude at the first slope 306 until a frequency of the phase current increases above a given threshold corresponding to speed_1. The phase current $I_{PHASE}$ then increases in amplitude at the second slope 308 until reaching the rated current in the feedback control phase 310d.

When the open-loop end-point of the phase current level matches the required driving current using sensorless control, the phase advance error will be minimized. Thus, the acoustic noise from the motor is also minimized as well.

As used herein, open loop motor control refers to a mode of operation in which no information about the rotor position is used by the control algorithm.

In embodiments, an absolute value of the first slope 306 is less than an absolute value of the second slope 308. That is, the rate of change in phase current amplitude at the second slope 308 is greater than a rate of change at the first slope 306. In some embodiments, the first slope may be one, which is a horizontal line.

It is understood that first and second slopes 306, 308 and the transition frequency are dependent upon motor characteristics. The transition frequency may be based on an internal estimated frequency (actual driving frequency), for example. When the driving frequency exceeds the threshold, then the current amplitude is defined by the second slope 308. In embodiments, the transition at the end of open loop start up is defined by a selected frequency value of the start up phase current. In embodiments, the transition frequency value is selected by a user. The phase current frequency increases at some rate until reaching a desired motor speed and the current amplitudes are limited by the first slope 306, then the second slope 308, and then rated current 312.

It is understood that the values for the first and second slopes can be defined to meet desired operating characteristics for a given motor. In embodiments, values for the first slope, the second slope, and/or the transition frequency can be selected, such as by a user as a configuration parameter.

Figure 4:
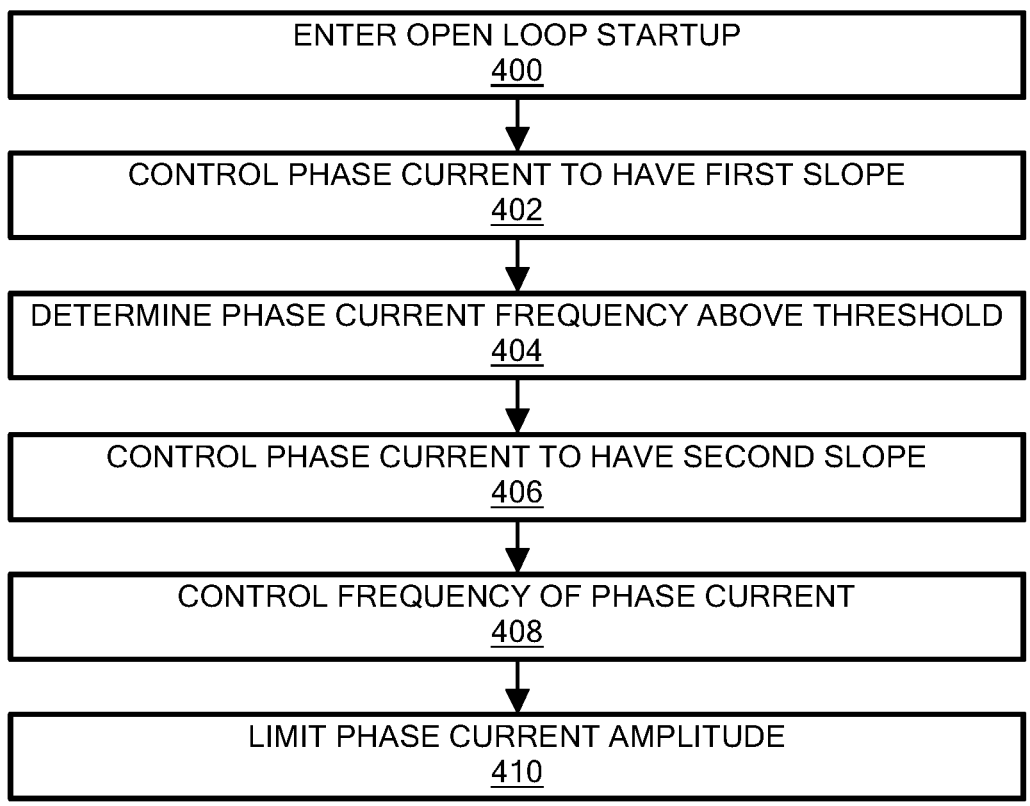
FIG. 4 is a flow diagram showing an example sequence of steps for controlling phase current to a three-phase motor for reducing acoustic noise during startup in accordance with example embodiments of the disclosure.

FIG. 4 shows an example sequence of steps for controlling phase current to a motor during open loop startup to reduce acoustic noise. In step 400, a motor controller enters open loop startup. For example, after rotor alignment the controller can transition to open loop startup. In step 402, the controller controls the phase current amplitude to have a first slope. In embodiments, the first slope is negative so that amplitude decreases. In step 404, it is determined that a frequency of the phase current is at or above a selected threshold and the controller transitions to a feedback control phase. In step 406, the controller controls the phase current amplitude to have a second slope. In embodiments, the second slope is positive so that current amplitude increases. In step 408, the controller controls a frequency of the phase current to achieve a selected frequency. In step 410, the phase current is limited to a selected amplitude which can be referred to as rated current.

Figure 5:
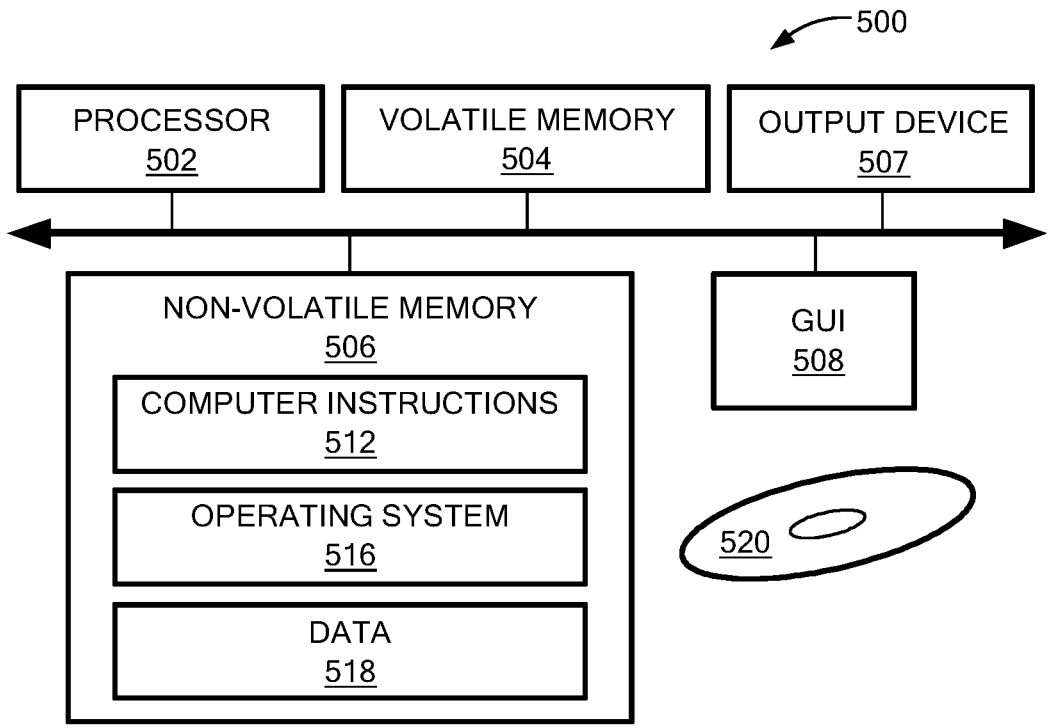
FIG. 5 is a schematic representation of an example computer that can perform at least a portion of the processing described herein.

FIG. 5 shows an exemplary computer 500 that can perform at least part of the processing described herein, such as controlling phase current amplitude as shown in FIG. 3. The computer 500 includes a processor 502, a volatile memory 504, a non-volatile memory 506 (e.g., hard disk), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)). As used herein, circuitry refers to any implementation of hardware, firmware, and/or software that includes at least one transistor, i.e., is not per se software.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
    starting up a three-phase BLDC motor in open loop by:
    during rotor alignment of the motor, allowing a maximum start up amplitude for a phase current to the motor;
    after the rotor alignment, performing open loop motor startup during which an amplitude of the phase current has a negative first slope; and
    transitioning the amplitude of the phase current to a positive second slope,
    wherein a rate of change for the second slope is greater than a rate of change of the first slope.

2. The method according to claim 1, further including transitioning the phase current to the second slope when a frequency of the phase current reaches a first threshold that defines a transition frequency.

3. The method according to claim 1, wherein the slope of the phase current equals one when an amplitude of the phase current reaches a second threshold.

4. The method according to claim 1, further including receiving a value for the transition frequency from a user.

5. The method according to claim 1, wherein the rotor alignment moves the rotor to a known position.

6. The method according to claim 1, wherein the phase current is at the maximum start up amplitude at the beginning of the open loop startup.

7. The method according to claim 1, wherein the transition frequency corresponds to a given speed of the motor.

8. A motor controller, comprising:
    circuitry configured to:
    start up a three-phase BLDC motor in open loop by:
    during rotor alignment of the motor, allow a maximum start up amplitude for a phase current to the motor;
    after the rotor alignment, perform open loop motor startup during which an amplitude of the phase current has a negative first slope; and
    transition the amplitude of the phase current to a positive second slope,
    wherein a rate of change for the second slope is greater than a rate of change of the first slope.

9. The motor controller according to claim 8, wherein the circuitry is further configured to transition the phase current to the second slope when a frequency of the phase current reaches a first threshold that defines a transition frequency.

10. The motor controller according to claim 8, wherein the slope of the phase current equals one when an amplitude of the phase current reaches a second threshold.

11. The motor controller according to claim 8, wherein the circuitry is further configured to receive a value for the transition frequency from a user.

12. The motor controller according to claim 8, wherein the rotor alignment moves the rotor to a known position.

13. The motor controller according to claim 8, wherein the phase current is at the maximum start up amplitude at the beginning of the open loop startup.

14. The motor controller according to claim 8, wherein the transition frequency corresponds to a given speed of the motor.

15. The motor controller according to claim 8, wherein the motor controller comprises a BLDC motor controller IC package.

16. A motor controller IC package, comprising:
    output pins to provide signals to drive a three-phase BLDC motor; and
    means for starting up the three-phase BLDC motor by performing open loop motor startup during which an amplitude of the phase current has a first slope, and transitioning the amplitude of the phase current to a second slope when a frequency of the phase current reaches a first threshold that defines a transition frequency, wherein the first slope is negative, wherein the second slope is positive, and wherein a rate of change for the second slope is greater than a rate of change of the first slope.

* * * * *